United States Patent
Liu et al.

(10) Patent No.: US 12,417,389 B2
(45) Date of Patent: Sep. 16, 2025

(54) EFFICIENT MIXED-PRECISION SEARCH FOR QUANTIZERS IN ARTIFICIAL NEURAL NETWORKS

(71) Applicant: Adobe Inc., San Jose, CA (US)

(72) Inventors: Zichuan Liu, San Jose, CA (US); Kun Wan, San Jose, CA (US); Xin Lu, San Jose, CA (US)

(73) Assignee: Adobe Inc., San Jose, CA (US)

(*) Notice: Subject to any disclaimer, the term of this patent is extended or adjusted under 35 U.S.C. 154(b) by 1214 days.

(21) Appl. No.: 17/100,651

(22) Filed: Nov. 20, 2020

(65) Prior Publication Data

US 2022/0164666 A1    May 26, 2022

(51) Int. Cl.
*G06N 3/084* (2023.01)
*G06N 3/045* (2023.01)

(52) U.S. Cl.
CPC .......... *G06N 3/084* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 2020/0097831 A1* | 3/2020 | Wang | G06N 3/082 |
| 2020/0293893 A1* | 9/2020 | Georgiadis | G06N 3/082 |
| 2021/0005208 A1* | 1/2021 | Beack | G06N 3/045 |
| 2021/0218414 A1* | 7/2021 | Malhotra | G06N 5/046 |
| 2021/0232890 A1* | 7/2021 | Li | G06N 3/063 |

OTHER PUBLICATIONS

Bender, G. "Understanding and Simplifying One-Shot Architecture Search," 2019, 10 pages.
Bengio, et al., "Estimating or Propagating Gradients Through Stochastic Neurons for Conditional Computation," arXiv preprint arXiv:1308.3432, 2013, 12 pages.
Bi, et al., "Stabilizing DARTS with Amended Gradient Estimation on Architectural Parameters," arXiv preprint arXiv:1910.11831, 2019, 22 pages.
Brock, et al., "Smash: One-Shot Model Architecture Search Through Hypernetworks," arXiv preprint arXiv:1708.05344, 2017, 21 pages.
Cai, et al., "Deep Learning with Low Precision by Half-wave Gaussian Quantization," in Proceedings of the IEEE Conference on Computer Vision and Pattern Recognition, 2017, pp. 5918-5926.
Cai, et al., "ProxylessNAS: Direct Neural Architecture Search on Target Task and Hardware," arXiv preprint arXiv:1812.00332, 2018, 13 pages.
Cai, et al., "Rethinking Differentiable Search for Mixed-Precision Neural Networks," arXiv preprint arXiv:2004.05795, 2020, 10 pages.

(Continued)

*Primary Examiner* — Tsu-Chang Lee
(74) *Attorney, Agent, or Firm* — Keller Preece PLLC

(57) ABSTRACT

A method for performing efficient mixed-precision search for an artificial neural network (ANN) includes training the ANN by sampling selected candidate quantizers of a bank of candidate quantizer and updating network parameters for a next iteration based on outputs of layers of the ANN. The outputs are computed by processing quantized data with operators (e.g., convolution). The quantizers converge to optimal bit-widths that reduce classification losses bounded by complexity constrains.

20 Claims, 11 Drawing Sheets

(56) References Cited

OTHER PUBLICATIONS

Chen, et al., "Drop an Octave: Reducing Spatial Redundancy in Convolutional Neural Networks with Octave Convolution," in Proceedings of the IEEE International Conference on Computer Vision (ICCV), 2019, pp. 3434-3443.

Choi, et al, "Pact: Parameterized Clipping Activation for Quantized Neural Networks," arXiv preprint arXiv:1805.06085, 2018, 15 pages.

Chu, et al., "Fairnas: Rethinking Evaluation Fairness of Weight Sharing Neural Architecture Search," arXiv preprint arXiv:1907.01845, 2019, 23 pages.

Courbariaux, et al., "Binaryconnect: Training Deep Neural Networks with binary weights during propagations," in Advances in neural information processing systems, 2015, pp. 3123-3131.

Deng, et al., "Imagenet: A Large-Scale Hierarchical Image Database," in 2009 IEEE conference on computer vision and pattern recognition. IEEE, 2009, pp. 248-255.

Guo, et al., "Single Path One-Shot Neural Architecture Search with Uniform Sampling," arXiv preprint arXiv:1904.00420, 2019, 16 pages.

Han, et al., "Deep Compression: Compressing Deep Neural Networks with Pruning, Trained Quantization and Huffman Coding," arXiv preprint arXiv:1510.00149, 2015, 14 pages.

Han, et al., "Learning both Weights and Connections for Efficient Neural Network," in Advances in neural information processing systems, 2015, pp. 1135-1143.

He, et al., "Deep Residual Learning for Image Recognition," in Proceedings of the IEEE conference on computer vision and pattern recognition, 2016, pp. 770-778.

Howard, et al., "MobileNets: Efficient Convolutional Neural Networks for Mobile Vision Applications," arXiv preprint arXiv:1704.04861, 2017, 9 pages.

Howard, et al., "Searching for MobileNetv3," in Proceedings of the IEEE International Conference on Computer Vision (ICCV), 2019, pp. 1314-1324.

Hubara, et al., "Binarized Neural Networks: Training Neural Networks with Weights and Activations Constrained to +1 or −1," in Advances in neural information processing systems, 2016, pp. 4107-4115.

Jung, et al., "Learning to Quantize Deep Networks by Optimizing Quantization Intervals with Task Loss," in Proceedings of the IEEE Conference on Computer Vision and Pattern Recognition (CVPR), 2019, pp. 4350-4359.

Krizhevsky, A., "Cifar-10 and cifar-100 datasets," 2009. [Online]. Available: https://www.cs.toronto.edu/~kriz/cifar.html, 3 pages.

Lillicrap, et al., "Continuous Control with Deep Reinforcement Learning," arXiv preprint arXiv:1509.02971, 2015, 14 pages.

Liu, et al., "Darts: Differentiable Architecture Search," arXiv preprint arXiv:1806.09055, 2018, 13 pages.

Pham, et al., "Efficient Neural Architecture Search via Parameter Sharing," arXiv preprint arXiv:1802.03268, 2018. 11 pages.

Rastegari, et al, "XNOR-NET: ImageNet Classification Using Binary Convolutional Neural Networks," in European conference on Computer Vision. Springer, 2016, pp. 525-542.

Sandler, et al., "MobileNetV2: Inverted Residuals and Linear Bottlenecks," in Proceedings of the IEEE Conference on Computer Vision and Pattern Recognition (CVPR), 2018, pp. 4510-4520.

Schulman, et al., "Proximal Policy Optimization Algorithms," arXiv preprint arXiv:1707.06347, 2017, 12 pages.

Singh, et al., "HetConv: Heterogeneous Kernel-Based Convolutions for Deep CNNs," in Proceedings of the IEEE conference on Computer Vision and Pattern Recognition (CVPR), 2019, pp. 4830-4839.

Stamoulis, et al., "Single-Path NAS: Designing Hardware-Efficient ConvNets in less than 4 Hours," arXiv preprint arXiv:1904.02877, 2019, 16 pages.

Tan, et al., "MnasNet: Platform-Aware Neural Architecture Search for Mobile," in Proceedings of the IEEE Conference on Computer Vision and Pattern Recognition (CVPR), 2019, pp. 2820-2828.

Wang, et al., "HAQ: Hardware-Aware Automated Quantization with Mixed Precision," in Proceedings of the IEEE conference on Computer Vision and Pattern Recognition (CVPR), 2019, pp. 8612-8620.

Wu, et al. "Mixed Precision Quantization Of ConvNets via Differentiable Neural Architecture Search," arXiv preprint arXiv:1812.00090, 2018, 11 pages.

Wu, et al., "FBNet: Hardware-Aware Efficient ConvNet Design via Differentiable Neural Architecture Search," in Proceedings of the IEEE Conference on Computer Vision and Pattern Recognition (CVPR), 2019, pp. 10 734-10 742.

Xie, et al., "SNAS: Stochastic Neural Architecture Search," arXiv preprint arXiv:1812.09926, 2018, 17 pages.

Xu, et al., "PC-DARTS: Partial Channel Connections for Memory-Efficient Differentiable Architecture Search," arXiv preprint arXiv:1907.05737, 2019, 13 pages.

You, et al., "GreedyNAS: Towards Fast One-Shot NAS with Greedy Supernet," arXiv preprint arXiv:2003.11236, 2020. 15 [ages.

Zhang, et al., "LQ-Nets: Learned Quantization for Highly Accurate and Compact Deep Neural Networks," in Proceedings of the European conference on computer vision (ECCV), 2018, pp. 365-382.

Zhou, et al., "DoReFa-NET: Training Low Bitwidth Convolutional Neural Networks with Low Bitwidth Gradients," arXiv preprint arXiv:1606.06160, 2016, 13 pages.

Zhu, et al., "Trained Ternary Quantization," arXiv preprint arXiv:1612.01064, 2016, 10 pages.

Zhuang, et al., "Towards Effective Low-bitwidth Convolutional Neural Networks," in Proceedings of the IEEE conference on computer vision and pattern recognition, 2018, pp. 7920-7928.

Zoph, et al., "Neural Architecture Search with Reinforcement Learning," arXiv preprint arXiv:1611.01578, 2016, 16 pages.

\* cited by examiner

EFFICIENT MIXED-PRECISION SEARCH FOR QUANTIZERS IN ARTIFICIAL NEURAL NETWORKS

TECHNICAL FIELD

The disclosed technology relates to designing and implementing artificial neural networks as well as their practical applications.

BACKGROUND

Computer vision has become ubiquitous in society, with applications in search, image recognition, mobile apps, mapping, medicine, drones, and self-driving cars. Core to many of these applications are visual recognition tasks such as image classification, localization, and detection. Recent developments in artificial neural networks (ANN) have greatly advanced the performance of visual recognition systems. Deep learning is part of a broader family of machine learning methods that are based on ANNs. Deep learning architectures such as deep neural networks, deep belief networks, recurrent neural networks and convolutional neural networks (CNNs) have been applied to fields including computer vision. The practical applications for ANNs are far and wide, encompassing finance, personal communication, industry, education, and so on.

Typically, a computing device that runs an application using an ANN needs to be connected to the Internet to have access to a deep neural network. For example, a mobile phone collects data locally but the processing for a deep neural network is performed on remote servers. Thus, deep neural networks are not implemented in off-the-shelf devices for use without consistent Internet access. Accordingly, the availability of on-device applications with artificial intelligence remains limited.

SUMMARY

An efficient mixed-precision search (EMS) technique enables automatic and proxy-less mixed-precision network design on large-scale datasets. Unlike existing techniques that execute all bit-width options to search for an optimized bit-width, the EMS technique uses a folding quantizer module that only executes a sampled bit-width option together with a full-precision pass. First, by executing a sampled bit-width option, the EMS technique reduces computational cost in terms of throughput and memory usage during network training. Second, by executing a full-precision pass, network parameters in the unsampled bit-width options are updated in every training iteration, and thus the EMS technique achieves a reasonable rate of convergence. Moreover, the EMS technique selects a mixed-precision network with quantization errors most effective for loss minimization. For example, on CIFAR-10 and ImageNet datasets, the EMS technique outperforms both 8-bit and 4-bit uniform quantization results as well as other mixed-precision search techniques.

BRIEF DESCRIPTION OF THE DRAWINGS

Embodiments of the present technology will be described and explained through the use of the accompanying drawings.

Figure 1B:
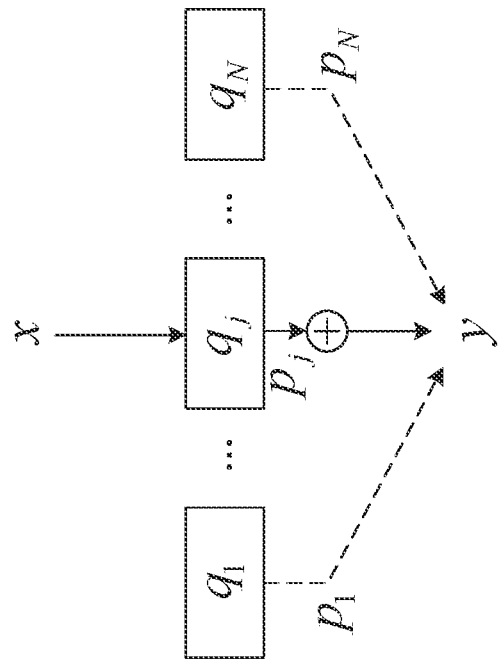
FIG. 1B illustrates a sampling-based single-path quantizer for a NAS.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Introduced here is an efficient mixed-precision search (EMS) technique to automate the design for an optimal artificial neural network (ANN). An ANN is a widely used model in the field of machine learning. Network architecture search (NAS) is a common technique for automating the design of an ANN. NAS has been used to design networks that are on par or outperform hand-designed architectures. Efforts to design efficient ANNs generally fall into three groups: design efficient operators, identify efficient network architectures, and convert full-precision networks to use low bit-widths. A "bit-width" refers to a number of bits used to represent a number.

The disclosed EMS technique automates a search for "optimal" mixed-precision parameters that offer improved accuracy and reduced computational costs compared to existing mixed-precision and single-precision search methods. A single-precision ANN uses the same size bit-width for all layers whereas a mixed-precision ANN uses different bit-widths for different layers. Mixed-precision search methods have been previously explored to find suitable bit-widths for allocation on network layers and achieve a mixed-precision network with lossless accuracy and higher computational efficiency. However, existing mixed-precision methods suffer from slow convergence or high training costs, especially with a large-scale training dataset. In contrast, an ANN with "optimal" mixed-precision bit-widths offers a best or favorable balance between accuracy and performance.

There are numerous benefits to using low-precision bit-width search methods, which are also referred to here as "reduced-precision" because the precision is less than a full-precision counterpart. First, reduced-precision formats require less memory, thereby enabling training and deployment of larger neural networks. Second, reduced-precision formats require less memory bandwidth, thereby increasing data transfer operations. Third, math operations run faster in reduced-precision formats compared to full-precision formats. Mixed-precision training achieves all these benefits while ensuring that task-specific accuracy is not lost compared to full-precision training, or there is only a negligible or acceptable amount of loss.

More breakthrough technologies are enabled by improving computational efficiencies while maintaining task-specific accuracies. For example, ANNs that implement deep learning have led to breakthroughs in several areas, including image processing and understanding, language modeling, language translation, speech processing, game playing, and many others. ANN complexity has increased to achieve these breakthroughs, which in turn has increased the computational resources required to train networks. One way to lower the required computational resources is to use lower-precision arithmetic with mixed-precision operations.

In a particular example, computer vision is a field of artificial intelligence that trains computers to interpret and understand the visual world. Computer vision tasks include methods for acquiring, processing, analyzing and "understanding" digital images, and extraction of high-dimensional data from the real world in order to produce numerical or symbolic information, e.g., in the forms of decisions. The "understanding" refers to the transformation of visual images (the input) into descriptions of the world. A convolutional neural network (CNN) is an example of an ANN that is commonly used for object detection and classification, with millions of images and hundreds of object classes.

However, a computing device that runs a computer vision application using a CNN needs to be connected to the Internet to have access to a deep neural network. For example, a smartphone that collects visual data typically processes the collected data on a deep neural network on remote servers. Thus, the availability of on-device applications with artificial intelligence (AI) is limited due to computational costs and power consumption. A trade-off to reduce computational costs and power consumption includes reducing task-specific accuracies of an on-device application, which is undesirable.

The EMS technique enables the design of efficient neural networks for mobile and internet-of-things (IoT) applications by addressing challenges such as computational cost, memory usage, battery usage, and model size. Implementing the EMS technique to run deep learning models in mobile environments will make AI technology readily accessible to the billions of smartphone users across the globe today.

Thus, overall, the EMS technique makes a significantly positive impact to on-device AI development. Moreover, by removing cloud dependencies, the EMS technique allows for direct interaction between end-users and applications, and better protects user privacy.

Thus, the users of the smart devices can benefit from using on-device technologies that are computationally light-weighted and energy efficient because the EMS technique enables the design of efficient neural networks that can run on mobile environments. For example, assuming that implementing the EMS technique saves a small amount of energy per smartphone (per day), an enormous amount of energy is saved in aggregate when considering the billions of smartphones across the globe today.

Network Architecture Search

Examples of algorithms in NAS include reinforcement learning-based NAS (RL-NAS), differentiable NAS (DNAS), and single-path-one-shot (SPOS). The RL-NAS is an end-to-end framework that considers a NAS as a Markov decision process (MDP) and can discover a model with high accuracy. However, training cost is prohibitively high due to its nature of delay rewards, which hinders its applications on a large-scale dataset. For example, RL-NAS requires thousands of GPU-days of searching/training to achieve state-of-the-art computer vision.

The DNAS searches for an optimal neural network architecture by firstly creating a super-network with microstructures parameterized by network and architecture parameters. An optimal neural network architecture is determined by sampling from the category distribution indicated by the architecture parameters. A deterministic attention (DA) mechanism can incorporate with architecture parameters to learn connections between data nodes by back-propagation. The DNAS methods are less complex and more stable than RL-NAS for training but consume a larger amount of computing resources and have a larger memory footprint.

The SPOS methods have better training efficiency than DNAS. Like DNAS, the SPOS methods firstly construct a super network with various candidate operations. Instead of executing all operators in one iteration, the super network in an SPOS framework is trained by sampling and optimizing a single path. The sampling can be uniform or follow specific strategies. A "super-network" based NAS provides a more computationally-efficient solution. The essential idea is to train one super-network that spans many options for the final design rather than generating and training thousands of networks independently. In addition to the learned parameters, a set of architecture parameters learn to prefer one module over another. These algorithms are differentiable, allowing the use of gradient descent for optimization.

A mixed-precision NAS is closely related to DNAS and SPOS methods. Under either DNAS or SPOS, the mixed-precision NAS is realized by implementing a candidate operator with paralleled candidate quantizers. With large amounts of quantizers inserted into a base model, however, the DNAS-based mixed-precision methods run slow due to high training complexity. Although SPOS is faster than DNAS, optimization converges more slowly due to an asynchronous parameter update and highly-varying gradient during training. Therefore, considering resource consumption and training time, both DNAS and SPOS are undesirable when training with a large-scale dataset.

Neural Network Quantization

Neural network quantization is a tool used to satisfy performance requirements while conforming with memory and battery usage limits. Quantization is a process of approximating an ANN that uses floating-point numbers with an ANN of low bit-width numbers. Quantization dramatically reduces the memory requirement and computational cost of using ANNs. For example, weights and activations of an ANN can be represented using 8-bit integers (or INT8) rather than 32-bits, without incurring significant loss in accuracy.

Neural network quantization can take a trained full-precision network and quantize its weights into a pre-set bit-width, which reduces runtime computational cost while sacrificing accuracy in, for example, image classification of a computer vision system. To avoid a significant drop in accuracy, neural networks include quantization modules and jointly train weights and quantization parameters ("quantizers"). By learning quantizers, a NAS can successfully produce a uniform 4-bit residual neural network (ResNet) that nearly matches the accuracy of a full-precision counterpart in image classification. However, a drop in accuracy that is caused by quantization differs across various network architectures, and retaining accuracy is more challenging when quantizing compact networks such as mobile architectures (e.g., MobileNetV2, MobileNetV3). As a result, uniform low-bit networks of a compact architecture that implement quantization approaches have a deficiency in accuracy relative to their full-precision counterparts.

Quantization generally approximates 32-bit full-precision weights and activations with binary representation. The computation complexity is reduced by replacing floating-point operations with bit-wise operations. Although these methods save memory and computation, they result in a dramatic degradation in accuracy. Some techniques approximate an ANN with more bits. In one example, both ternary values and scaled gradients are learned to approximate 32-bit weights. An example includes DoReFa-Net quantized activation, where weights and gradients use different bit-widths. In another example, a technique uses an activation quantizer with a learnable clipping parameter. In another example, a quantizer adaptively adjusts its quantization levels during training. The quantization error is obtained by minimizing the mean square difference between full-precision data and quantized data.

In yet another example, quantization intervals of a quantizer are learned. The input data is firstly passed to a non-linear transform with learnable parameters and clipped into the range of [0, 1] before feeding into a uniform quantizer. These learnable quantizers Consistently retain the accuracy of a full-precision network with 4-bit precision on neural network architectures. Uniform quantization results on compact neural networks such as MobileNetV1, V2, V3 are rarely reported.

Mixed-Precision Search

Uniform quantization requires pre-set and fixed numerical precision during training of the ANN. However, as different layers exhibit different sensitivity to quantization error, a uniform numerical precision is sub-optimal in most cases. To address this problem, an ANN can provide for optimal bit-width allocation for particular layers of the ANN. That is, the quantization is not fixed and a suitable low-precision format is selected during training.

A mixed-precision network provides improved accuracy compared to a single-precision (SP) network while reducing computational costs. Mixed-precision training offers significant computational savings by, for example, performing operations in half-precision format while storing minimal information to retain as much information as possible in critical parts of the network. However, manual design of a mixed-precision network is impractical due to enormous design choices.

A suitable mixed-precision design can be identified by using NAS. In one example, a super network is constructed by replacing each full-precision operator with a set of mixed-precision operators and optimizing for the bit-width used in each operator for weights and activations. However, implementing this solution is not trivial because, for example, quantization functions introduce computational cost. For example, existing quantization functions that offer improved accuracy such as LQ-Net and QIL cost significantly more than a linear function that scales the input into a fixed range. Therefore, searching for an optimal mixed-precision network takes a long time, especially when the training dataset is large as with ImageNet.

In another example, a hardware-aware automated quantization (HAQ) framework is used for mixed-precision network design. The HAQ adopts RL to search a quantization policy with direct hardware feedback, which performs better in latency, energy and model size compared with rule-based approaches. However, HAQ trains slowly and the exploration step includes a fine-tuning that is time-consuming and requires class sub-sampling to reduce complexity. In yet another example, mixed-precision training is based on DNAS to construct a deterministic or stochastic super-network parameterized by network parameters and architecture parameters (e.g., probabilities). Recent mixed-precision search techniques are motivated by DNAS and developed based on a DA mechanism. Optimal bit-width allocation is resolved by training the super-network under complexity-constrained classification loss and then sampling a sub-network with highest architecture probabilities.

Efficient Mixed-Precision Search

Figure 1A:
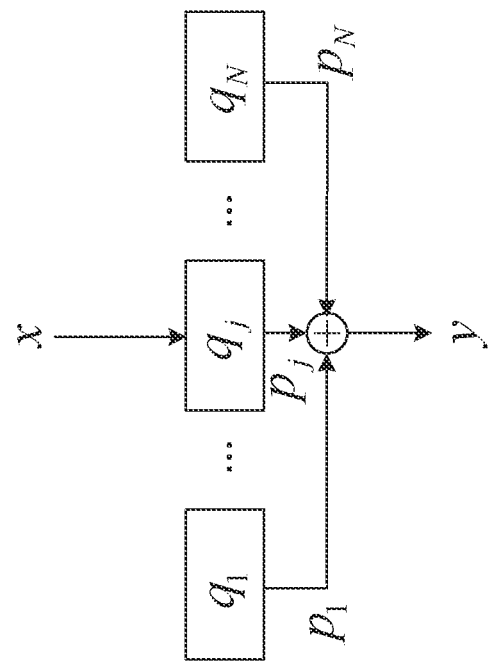
FIG. 1A illustrates unfolded quantization parameters ("quantizers") for a mixed-precision network architecture search (NAS).
Figure 1C:
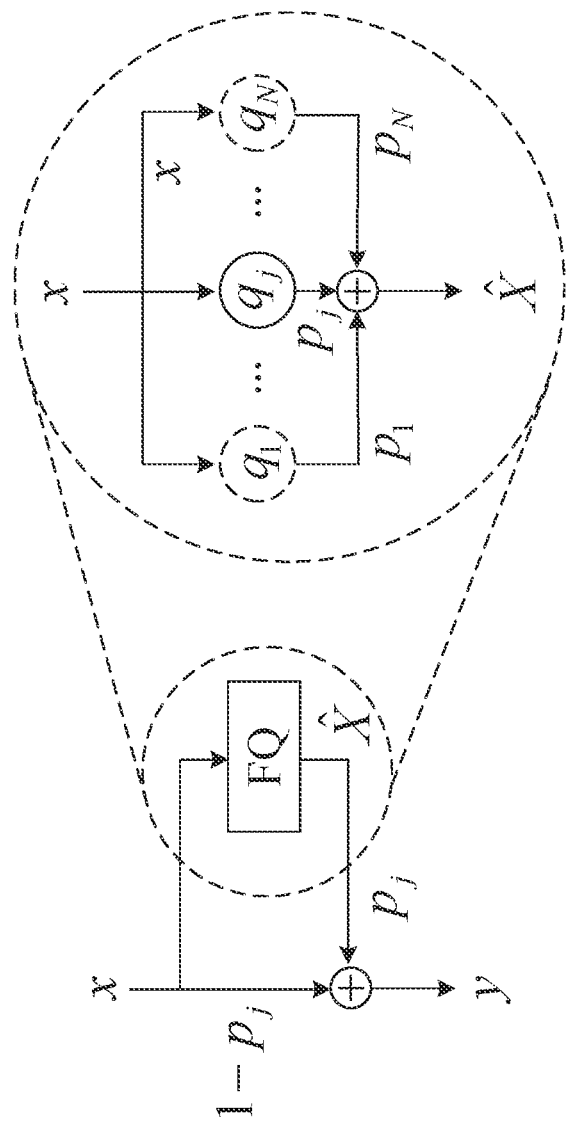
FIG. 1C illustrates a folding quantizer for a NAS.

FIGS. 1A through 1C are block diagrams that illustrate different quantizers for networks. FIG. 1A depicts an unfolding quantizer of a DA mixed-precision. As shown, a base network is extended by unfolded candidate quantizers (also referred to as a "quantizer") for each operator. The unfolding quantizers $Q=\{q_1 \ldots q_N\}$ are associated with a probability distribution $P=\{p_1 \ldots p_N\}$. An output $y_j$ is computed given an input x and a candidate quantizer $q_j$. The training complexity grows linearly with each additional candidate quantizer and thus is prohibitively high when searching a large dataset. Although the training cost can be reduced by searching on a proxy task, reducing the number of bit-width options (e.g., reducing quantizers), or randomly forwarding a single candidate quantizer in every iteration, the performance of the resulting network is sub-optimal in most cases.

FIG. 1B depicts a sampling-based SP quantizer implemented in NAS. The SP approach reduces training costs but converges much slower than the DA-based method of FIG. 1A due to its nature of asynchronous parameter update and highly-varying gradient. Computation in every iteration is reduced at the expense of significantly increasing the number of iterations. As a result, training time of SP methods for mixed-precision search is impractical.

FIG. 1C depicts a folding quantizer (FQ) of the EMS technique. This mixed-precision network satisfies two desired conditions: the network can search with a large-scale dataset and has a suitable bit-width search space, e.g., {1,2,4,8}. During training, the EMS technique reduces a number of quantizers in each training iteration, without limiting the complexity of a quantizer and while retaining efficiency.

In each training iteration, a forward function proceeds as a weighted sum of a selected quantizer output and an identity transform, which is a transformation that copies source data to a destination without making any change to the source data. The design reduces computational cost compared to unfolding quantizers, which execute all candidate quantizers concurrently. The quantizer selection is controlled by a learned probability distribution tied to architecture parameters. An implementation uses probability-based sampling, where a quantizer with a higher probability is selected for a given training iteration. However, although the quantizer with a higher probably has a greater chance of being sampled, the higher probability is not determinative of being selected. During training, a candidate quantizer with its quantization error direction aligned with the gradient decent direction gets a higher probability. By introducing the FQ module including an identity connection, the gradient descend becomes more stable compared with SP-based approaches and thus maintains a fast convergence.

Implementations on CIFAR-10 and ImageNet datasets, which are each a collection of images that are commonly used to train machine learning and computer vision algorithms, show that the EMS technique achieves 72% and 42% complexity reduction on ResNet-18 and MobileNet-v2 models, respectively, compared with 8-bit uniform quantization results. Compared to other mixed-precision networks, the EMS technique reduces training time by 3X and memory usage by 1.5×n, with better accuracy and computation efficiency.

Constructing a Folded Quantization Module

Figure 2B:
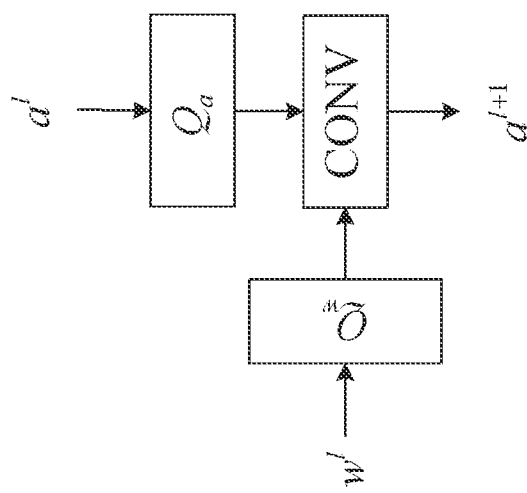
FIG. 2B illustrates a low-precision ANN that is constructed from a full-precision network by inserting quantizers between data nodes and operator nodes.
Figure 2A:
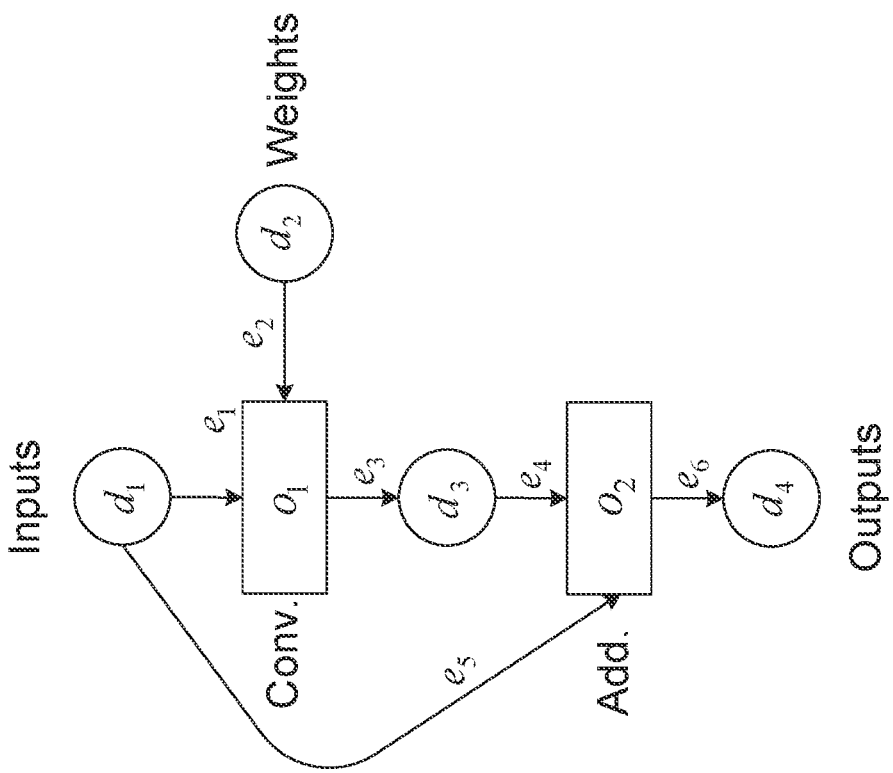
FIG. 2A illustrates a residual block of an artificial neural network (ANN).

FIGS. 2A through 2D illustrate blocks of an ANN. Specifically, FIG. 2A illustrates a residual block represented by a directed acyclic graph N(D,O,E) with data nodes D:={$d_1, \ldots, d_K$}, operator nodes O:={$o_1, \ldots, o_L$}, and edges E:={$e_1, \ldots, e_M$}. This includes input $d_1$, weight $d_2$ and output $d_4$. Here, examples of the nodes $o_1$ and $o_2$ represent convolution and add operations.

FIG. 2B illustrates a low-precision neural network that is constructed from a full-precision network by inserting quantization operators between data nodes and downstream operator nodes. In the l-th layer, both weights $w^l$ and activations $a^l$ are converted into a low-precision format and fed into an operator, e.g., convolution. In existing techniques for training a low-precision network, the quantization nodes are implemented by adaptive quantizers with learnable parameters. In existing mixed-precision searching frameworks, quantization nodes can include unfolding quantizers (UFQ) including multiple candidate quantizers with different pre-defined bit-widths.

Figure 2C:
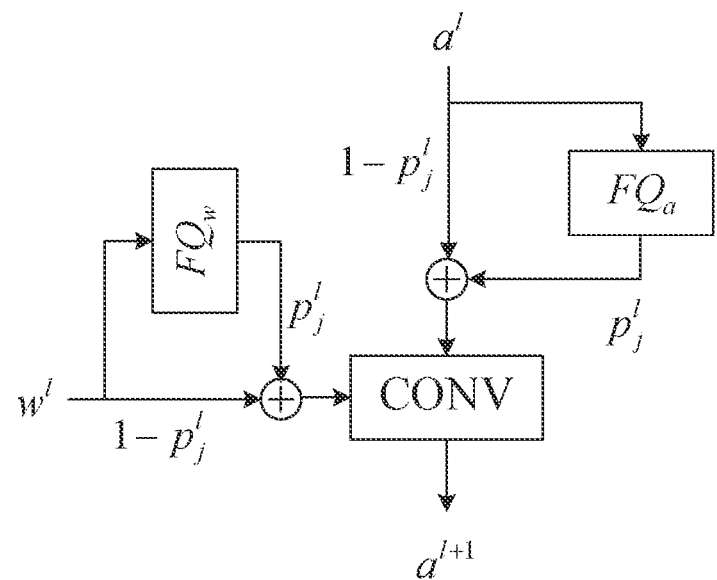
FIG. 2C illustrates a base network extended with folding quantizers.
Figure 2D:
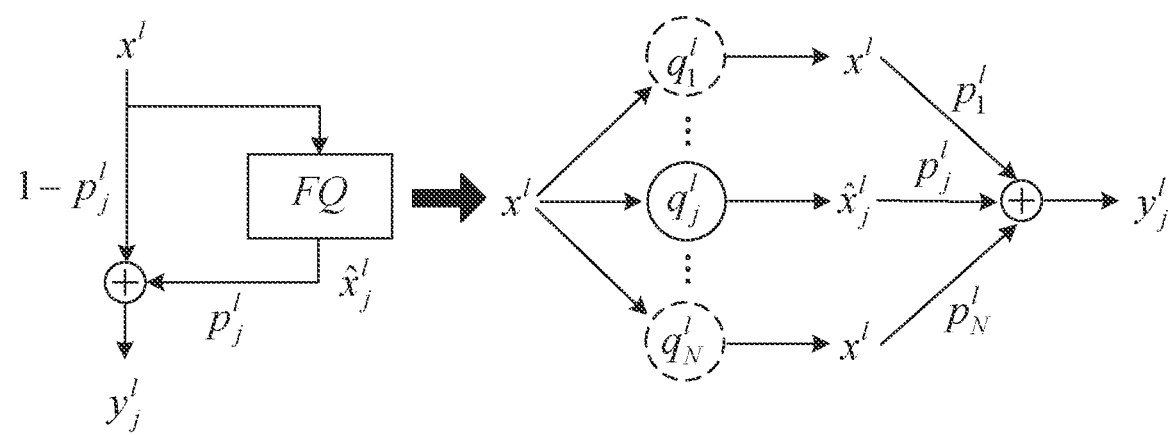
FIG. 2D illustrates a structure and equivalent graph of a folding quantizer.

FIG. 2C illustrates a base network extended with FQs of the disclosed EMS technique. The base network is extended to a super network by attaching an FQ to an edge between a data node and a downstream operator node. Further, FIG. 2D illustrates dynamics the microstructure and an equivalent graph of a FQ. As shown, an FQ is composed of N quantizers $Q^l:=\{q_1^l, \ldots, q_N^l\}$ with pre-defined bit-widths. In a training phase, an FQ independently samples a quantizer $q_j^l$ once per iteration according to a probability distribution $P^l=\{p_1^l, \ldots, p_N^l\}$. Given an input $x^l$ and an example quantizer $q_j^l$ sampled from $Q^l$, the output $y_j$ is computed by:

$$y_j^l = p_j^l \cdot \hat{x}_j^l + (1-p_j^l) \cdot x^l \tag{1}$$

where $\hat{x}_j^l$ is the low-precision data and $p_j^l$ is defined as a sampling probability of j-th candidate quantizer. The output $y_j^l$ can be regarded as the weighted sum of all paralleled edges with only one quantizer activated and the others replaced by skip connections. Moreover, the output $y_j^l$ can be reformulated by:

$$y_j^l = x^l + p_j^l \cdot \Delta x_j^l \tag{2}$$

where $\Delta x_j^l = \hat{x}_j^l - x^l$ represents the quantization error of j-th candidate quantizers. Therefore, the super network is constructed by injecting a random quantization noise to the input of every operator. The quantizer distribution $P^l$ also controls gain of the injected quantization noise. As will be shown later, $P^l$ potentially reveals the importance of the candidate quantizers for minimizing the loss function. Therefore, the optimal bit-width for l-th operator is determined by $P^l$, and the problem of optimal bit-width allocation is cast to learning a super network parameterized by $P:=\{P^1, \ldots, P^L\}$.

Learning Optimal Bit-Width

Given a super network N(D,O,E|P), the optimal bit-width allocation is regarded as learning the architecture parameters P by minimizing a classification loss under complexity constraints, which is formulated as:

$$P^* = \underset{P}{\operatorname{argmin}}\, L(x \mid \theta, P) \tag{3}$$

$$L(x \mid \theta, P) = L_{cls}(x \mid \theta, P) + \beta L_{cpx}(P) \tag{4}$$

where $L_{cls}(x|\theta, P)$ and $L_{cpx}(P)$ represent the classification loss and complexity loss. $\beta$ is the Lagrange multiplier. The classification loss is defined as the cross-entropy loss between ground-truth labels and predicted class distribution. The complexity loss is computed by:

$$L_{cpx}(P) = \log_{10}\left[\sum_{l=1}^{L} C(o_l, P^l)\right], \tag{5}$$

where $C(o_l)$ is denoted as the bitwise operations (BitOps) of an operator illustrated in Eq. 7.

$$C(o_l, P^l) = \mathbb{E}[b_{w^l}] \cdot \mathbb{E}[b_{a^l}] \cdot |o_l| \cdot W_{a^l} H_{a^l} / s_l^2 \tag{6}$$

$$= \left(\sum_{i=1}^{N} p_i^l \cdot b_{w^l}^i\right) \cdot \left(\sum_{i=1}^{N} p_i^l \cdot b_{a^l}^i\right) \cdot |o_l| \cdot W_{a^l} H_{a^l} / s_l^2 \tag{7}$$

In Eq. 7, $b_{w^l}^i$ and $b_{a^l}^i$ are the i-th bit-widths for weights and activation for l-th operator drawn from bit-width options (also referred to as bit options) $B:=\{1,2,4,8\}$, $|o_l|$ denotes the cardinality of a convolution filter, $H_{a^l}$ and $H_{w^l}$ represent the spatial size of input data, and $s_l$ is the filter stride.

Statistical Interpretation

The following describes the statistical behavior of architecture parameter $P^l$ of every FQ. Here, the statistic behavior of $P^l$ is characterized by its expected gradient, which can be represented by:

$$\mathbb{E}\left[\frac{\partial L}{\partial P^l}\right] = \mathbb{E}\left[\begin{bmatrix}\begin{bmatrix}\frac{\partial y_1^l}{\partial p_1^l} \cdot \frac{\partial L}{\partial y_1^l}\end{bmatrix} \\ \vdots \\ \begin{bmatrix}\frac{\partial y_j^l}{\partial p_j^l} \cdot \frac{\partial L}{\partial y_j^l}\end{bmatrix} \\ \vdots \\ \begin{bmatrix}\frac{\partial y_N^l}{\partial p_N^l} \cdot \frac{\partial L}{\partial y_N^l}\end{bmatrix}\end{bmatrix}\right] = \begin{bmatrix}p_1^l \Delta x_1^l \cdot \frac{\partial L}{\partial y_1^l} \\ \vdots \\ p_j^l \Delta x_j^l \cdot \frac{\partial L}{\partial y_j^l} \\ \vdots \\ p_N^l \Delta x_N^l \cdot \frac{\partial L}{\partial y_N^l}\end{bmatrix} = \begin{bmatrix}\Delta x_1^l \cdot \frac{\partial L}{\partial \hat{x}_1^l} \\ \vdots \\ \Delta x_j^l \cdot \frac{\partial L}{\partial \hat{x}_j^l} \\ \vdots \\ \Delta x_N^l \cdot \frac{\partial L}{\partial \hat{x}_N^l}\end{bmatrix} \quad (8)$$

As shown in Eq. 8, the expected gradient with respect to architecture parameters $P^l$ is related to the inner product between quantization error of i-th candidate quantizer $\Delta x_i^l$ and corresponding gradient respect to quantizer output $$\frac{\partial L}{\partial \hat{x}_i^l}.$$

Those quantizers with quantization errors most homodromous to their output gradient among the candidates are encouraged during the training. As shown, the architecture parameters P of the super network is evolving toward a distribution that is beneficial to minimizing the objective $L(x|\theta, P)$.

Figure 3B:
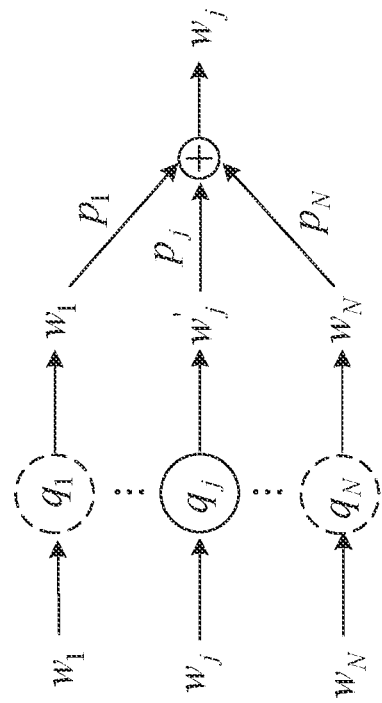
FIG. 3B illustrates an independent weight option of a folding quantizer where each candidate quantizer uses an independent weight.
Figure 3A:
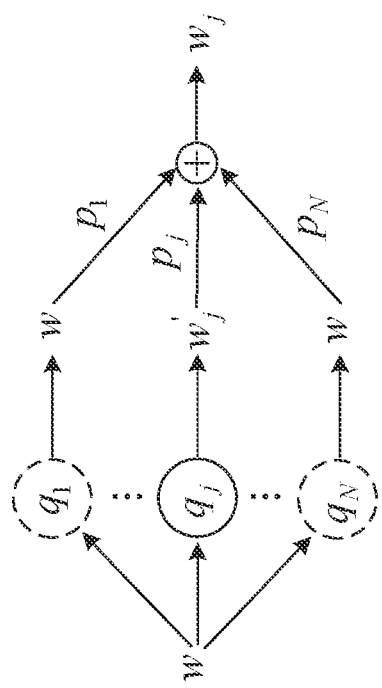
FIG. 3A illustrates a shared weight option of a folding quantizer where all quantizers share the same weight.

The FQ modules can use shared or independent weights. FIGS. 3A and 3B are block diagrams that illustrate shared weight and independent weight options. Specifically, FIG. 3A depicts a shared weight option. The shared weight can be used to facilitate training, where all quantizers share the same weight. FIG. 3B depicts the independent weight option. In the independent weight option, each quantizer candidate uses an independent weight for quantization. The shared weight option is more memory efficient during a training phase. The independent weight option consumes more memory but loss converges faster. However, final mixed-precision network that is trained with independent weights has a slightly better accuracy than a network trained with shared weight.

Examples

The following examples include settings and implementation details, followed by implementation results that demonstrate effectiveness and efficiency of network training, and the network accuracy and complexity of the EMS technique.

The EMS technique is compatible with various quantization approaches. In one example, there are four quantizers with bit-widths of {1,2,4,8} in an FQ. The candidate quantizers are implemented using the LQ-Net approach, which is one method in neural network quantization. In some layers, weights and activations are quantized using different bits, but the same bit-width is commonly used in weight and activation quantization in a common layer to improve operability for software and hardware design. This technique uses the same $P^l$ to control FQs of the same downstream operator.

The EMS technique improves over baseline methods (e.g., DA, SP, LQ-Net). Regarding DA, an HWGQ-Net is re-implemented and replaced with the LQ-Net quantization approach for a fair comparison. Regarding SP, the j-th quantizer $q_j$ is activated by probability sampling according to $p_j$. The gradient with respect to $p_j$ is computed by the straight-through estimator (STE) approach $$\left(\frac{\partial L}{\partial p_j} = \frac{\partial L}{\partial y}\right).$$

The LQ-Net is used as a baseline of uniform quantization and compared with both the 4-bit and 8-bit LQ-Net quantization results.

The performance of the EMS technique can be evaluated by using two base networks, ResNet18 and MobileNetV2 on the CIFAR-10 and the ImageNet datasets. ResNet18 is commonly used in quantization, while MobileNetV2 as MobileNetV2 adopt a light-weighted network architecture that is commonly used in mobile applications due to their efficiencies. Quantization on MobileNetV2 is challenging and rarely used in quantization because of limited computation resources on mobile devices.

In this example, for CIFAR-10, the input images have a size of 32×32. The four borders of an image are padded with four zero-pixels and an image is randomly cropped into an image with size of 32×32. The image is then horizontally flipped randomly. Finally, the augmented image is normalized with a channel mean of (0.491, 0.482, 0.447) and standard deviation of (0.247, 0.243, 0.262).

For ImageNet, a raw image can have any size. In an example, raw images are resized into images with shortest edge length of 224 and a center image is cropped using a window with size of 224×224. The brightness, contrast, saturation and lighting are randomly adjusted. For example, for an input image x, the brightness is adjusted using the equation shown below:

$$x = a \cdot x \quad (9)$$

where a is a scaling factor randomly chosen from [0.6, 1.4]. The contrast of the input image is adjusted by:

$$x = x \cdot r + (1-r) \cdot \bar{x} \quad (10)$$

where $\bar{x}$ is defined as the mean image computed by the averaging all pixel values in a batch and r is a randomly scaling factor sampled from [0, 1].

Evaluation metrics include accuracy, average bit-widths (Bits), computed BitOps, and GPU hours. The average bit-width is defined as the square root of BitOps normalized by the BitOps of a 1-bit quantized network. The GPU hours is computed as the product of training time and number of GPUs.

In one example, for the CIFAR-10 image set, a super net is trained for 1200 epochs with a batch size of 400. A standard stochastic gradient descent (SGD) optimizer is used for optimization with an initial learning rate of 0.1, momentum of 0.9, and weight decay of 4e-5. The learning rate is reduced to 0.01 after 58800 iterations. For ImageNet, a model is trained for 100 epochs with a batch size of 256. The SGD optimizer is adopted for network optimization with the same settings as those used in CIFAR-10 except that the learning rate decays every 150K iterations by a factor of 10. After network training, the quantizer with the highest $p^l$ of every FQ is selected and the resulted network is fine-tuned. The network weights from the training are used to initiate the network in the fine-tuning stage.

Figure 4B:
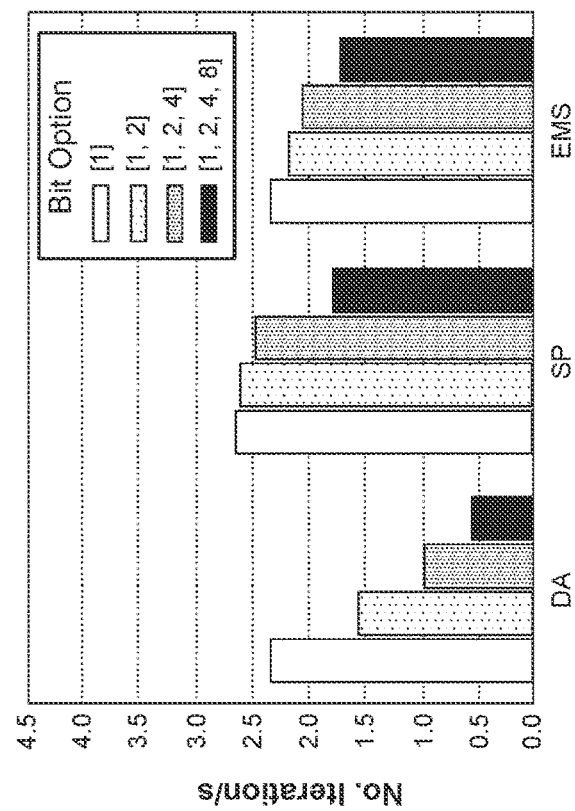
FIG. 4B is a graph that shows training throughput compared to bit-width options during training of an example network.
Figure 4A:
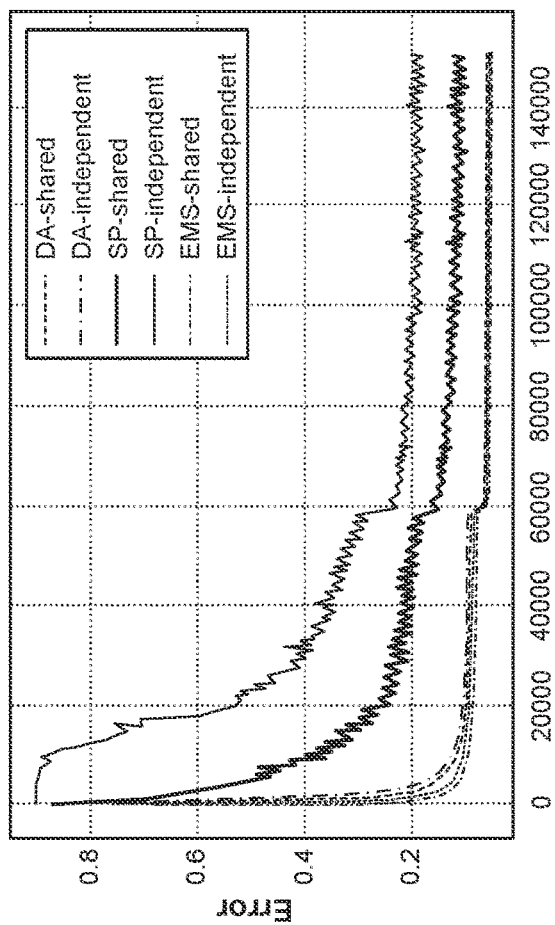
FIG. 4A is a graph that shows validation error compared to iterations during training of an example network.

The effectiveness and efficiency of network training is evaluated by comparing the proposed approach and the DA and SP on the rate of convergence, throughput and memory usage. In the example, the MobileNetV2 is used as the base model. FIG. 4A is a graph that shows validation error compared to iterations during training of a network. FIG. 4B is a graph that shows training throughput compared to bit options. during training of a network.

In the example implementations, the FQ modules use shared or independent weights. The impact of using the shared weight option versus using the independent weight option is evaluated. A comparison is performed of the SP, DA and EMS approach with the shared weight option and the independent weight option (e.g., SP-Shared, SP-Independent, DA-Shared, DA-Independent, EMS-Shared, and EMS-Independent).

FIG. 4A is a graph that shows validation error versus iterations. As shown, the validation error curves in network training show very close behavior between DA-Shared and DA-Independent and between EMS-Shared and EMS-Independent. In the SP case, SP-Shared converges faster and to a lower validation error comparing with SP-Independent. Results indicate that the DA and the EMS approach are not sensitive to the weight sharing option, and the SP converges better with the shared weight option.

As shown, the SP-Shared converges slower than the DA-Shared and EMS-Shared. The EMS-Shared converges faster than DA-Shared in the initial iterations. In the later iterations, curves of the EMS-Shared and the DA-Shared are overlapping and converge to a similar validation error. This indicates that the EMS approach has a similar rate of convergence with DA and significantly outperforms SP in terms of rate of convergence. The rate of convergence depends on parameter update mechanism in quantizer candidates. In DA, parameters in all quantizer candidates get updated in each training iteration. In the EMS approach, parameters in all quantizer candidates get updated in each training iteration regardless of which candidate is sampled. In SP, the parameters in a quantizer candidate only gets updated when that candidate is sampled.

In terms of training throughput and memory usage, these metrics are evaluated on an Nvidia RTX 2080 Ti™ GPU. The training throughput is defined as the number of iterations per second and the memory usage is observed by GPU monitor Nvidia System Management Interface. FIG. 4B is a graph that shows training throughput versus bit options. As shown, the training throughput of all three methods decrease as the search space gets smaller. Among the three approaches, the throughput of the DA decreases more rapidly than the SP and the EMS as each time one more bit option is dropped. This result shows that the SP and the EMS approaches are more scalable as the search space of bit options grow bigger.

Figure 4C:
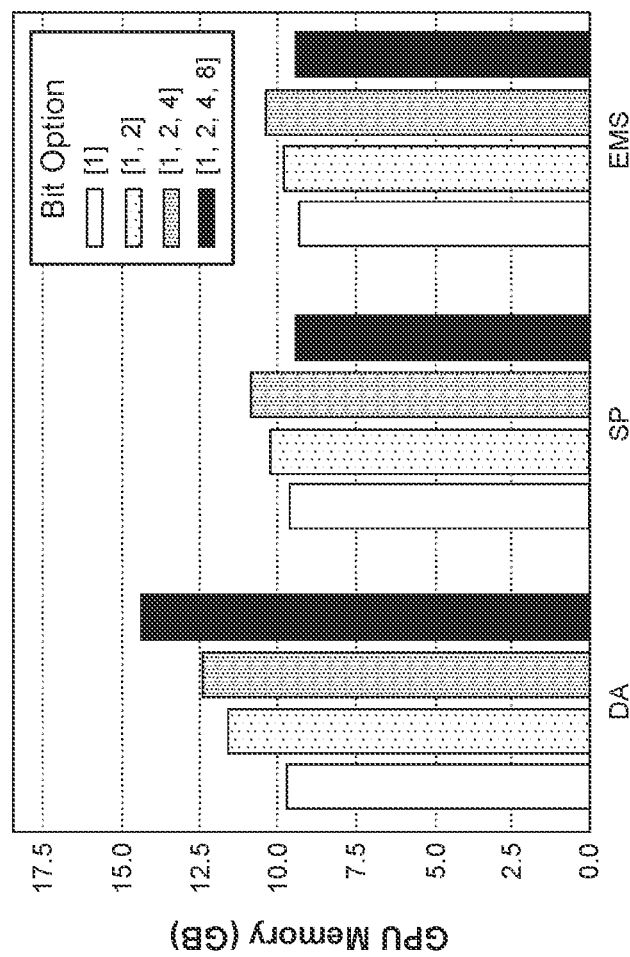
FIG. 4C is a graph that shows memory consumption compared to bit-width options.

FIG. 4C is a graph that shows memory consumption compared to bit options. As shown, the memory usage during training increases as more bit options are included in the search space. Compared with the SP and the EMS approaches, memory usage of the DA grows much faster. This result demonstrates that executing all quantizer candidates in training is expensive because of the memory consumption of the intermediate results produced by quantizer candidates in both the forward and backward pass. In contrast, the EMS approach runs as fast as the SP method with a similar amount of memory footprint. This is because the EMS approach only executes one quantizer once in an iteration. As a result, compared with DA, the EMS approach reduces the training time by 3× and memory usage by 34% when using the bit options of $\{1,2,4,8\}$.

The EMS technique improves over the DA mixed-precision search approach and the uniform quantization approach LQ-Net in terms of accuracy, inference complexity (BitOps) and training time cost (GPU hours). Table I shows results that compare these different approaches.

TABLE I

Benchmark Performance

| Method | ResNet-18 | | | | MobileNet-v2 | | | |
|---|---|---|---|---|---|---|---|---|
| | Top-1 | Bits | BitOps (G) | GPU Hrs | Top-1 | Bits | BitOps (G) | GPU Hrs |
| CIFAR-10 | | | | | | | | |
| Full | 94.1 | — | — | — | 94.5 | — | — | — |
| 8-bit | 94.6 | 8.00 | 35.43 | — | 93.5 | 8.00 | 2.79 | — |
| 4-bit | 94.3 | 4.00 | 8.86 | — | 93.0 | 4.00 | 0.68 | — |
| DA | 94.4 | 3.92 | 8.49 | 69 | 94.1 | 6.46 | 1.81 | 83 |
| SP | | | | | | | | |
| EMS | 94.7 | 3.73 | 7.70 | 20 | 94.3 | 6.15 | 1.64 | 26 |
| ImageNet | | | | | | | | |
| Full | 69.6 | — | — | — | 71.8 | — | — | — |
| 8-bit | 69.9 | 8.00 | 108.52 | — | — | — | — | — |
| 4-bit | 69.9 | 4.00 | 27.13 | — | 68.2 | 4.00 | 2.41 | — |
| DA | 69.8 | 6.28 | 66.90 | 140 | 70.8 | 7.45 | 8.36 | 175 |
| EMS† | 70.0 | 5.74 | 55.80 | 80 | 71.0 | 6.56 | 6.47 | 118 |
| EMS‡ | 69.5 | 4.05 | 27.75 | 68 | 66.9 | 2.73 | 1.12 | 107 |

(†accurate, ‡efficient)

The EMS approach achieves higher accuracy than the DA approach with lower inference complexity and shorter training time. With a similar accuracy, the mixed-precision ResNet-18 produced by the EMS technique has lower complexity than that produced by the DA approach. The mixed-precision MobileNetV2 produced by the EMS technique achieves higher accuracy (65.1%) and lower complexity than that by the DA approach. In terms of model size, 37% complexity reduction results in a model with 25% smaller than the DA one. In terms of training time, the EMS technique is 3× and 1.75× faster than the DA approach on the CIFAR-10 and the ImageNet datasets. The reason why the acceleration ratio is higher on the Cifar10 than the ImageNet is that the GPU machine suffers from a cooling problem when multiple GPU cards are used. The cooling problem drives the machine's temperature high, which slows down the computation. The training on CIFAR-10 are conducted with a single GPU, which does not cause the overheating. Therefore, the actual speedup on the ImageNet using the EMS technique is higher than that reported.

Compared with uniform quantization, LQ-Net, on the CIFAR-10, the EMS technique produces mixed-precision models based on ResNet-18 and MobileNetV2 with a better accuracy and much higher efficiency compared with the 8-bit LQ-Net. The ResNet-18 and MobileNetV2 models produced by the EMS approach are 4.6X and 1.7X more efficient than the 8-bit networks in terms of inference complexity, respectively. Regarding ImageNet, the EMS technique produces an accurate model (labeled with t) with accuracy of 65.5 and complexity of 55.80 GBitOps. Compared with the 8-bit LQ-Net, the technique achieves a better accuracy and is 2× more efficient. Meanwhile, the EMS technique (labeled with t) has a similar complexity (27.75 GBitOps) as the 4-bit LQ-Net network (27.13 GBitOps) and is 0.9% more accurate.

The results in Table I show that the accuracy and complexity of MobileNetV2 are more sensitive to quantization. In the example, the accuracy of a quantized MobileNetV2 is 0.7%-1.3% worse than that of a quantized ResNet-18 on both datasets. The EMS technique effectively improves the performance of quantized MobileNetV2 together with a considerable efficiency boost. The training process of a quantized network will more easily get trapped at a poor local-minima than a full-precision network due to the noisy gradient approximation. In the EMS approach, the gradient noise is suppressed by maintaining a full-precision path during training, which prevents being trapped at a sub-optimal local minima.

Figure 5A:
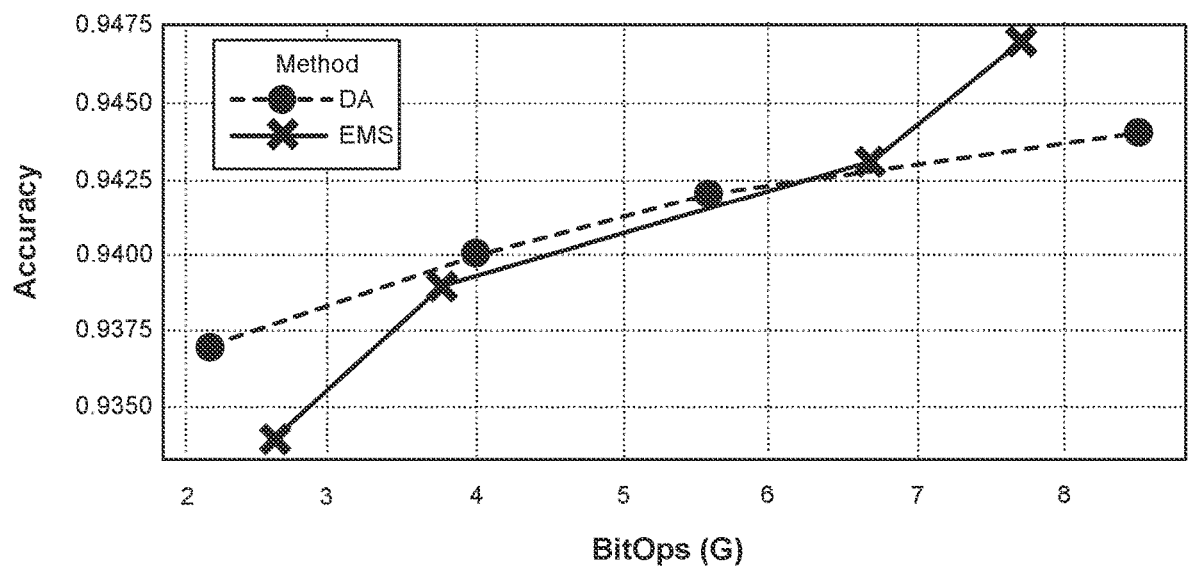
FIG. 5A is a graph that compares accuracy versus complexity of an implementation of the disclosed efficient mixed-precision search (EMS) technique on a ResNet-18.
Figure 5B:
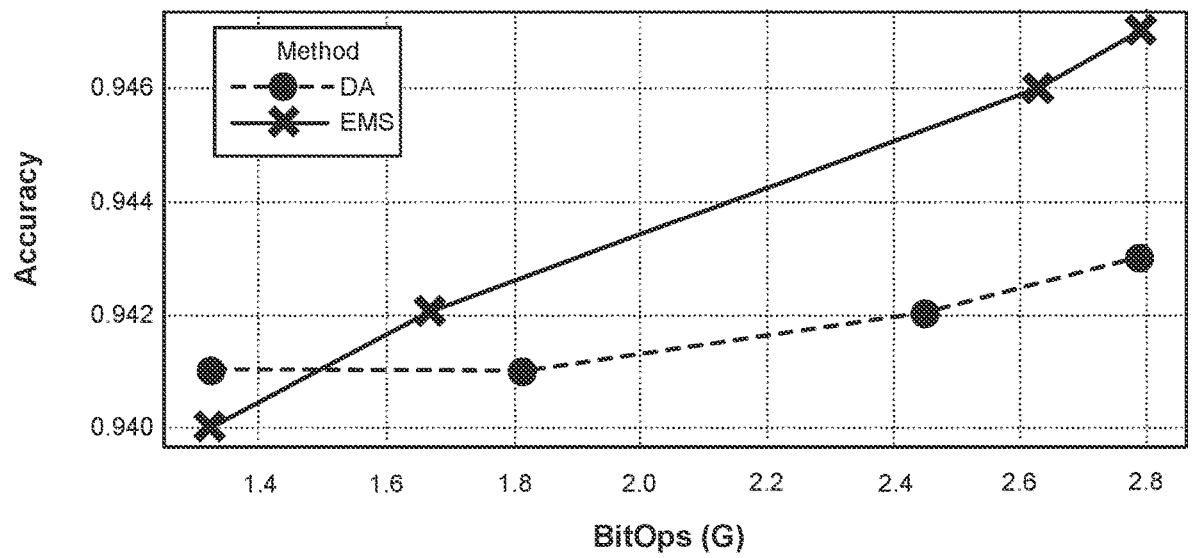
FIG. 5B is a graph that compares accuracy versus complexity of an implementation of the EMS technique on a MobileNet-v2.

The EMS technique is profiled for accuracy and complexity, compared with the DA. FIG. 5A is a graph that compares accuracy versus complexity on ResNet-18. FIG. 5B is a graph that compares accuracy versus complexity on MobileNet-v2. As shown, the EMS technique outperforms the DA technique, where the classification accuracy grows consistently with the increase of BitOps. Specifically, in FIG. 5A, the EMS technique achieves the highest accuracy of 94.7% with lower complexity than that of the DA method (7.70 GBitOps vs. 8.50 GBitOps). For the MobileNet-v2, the EMS approach outperforms the DA method with complexity ranging from 1.66 GBitOps to 2.8 GBitOps, as shown in FIG. 5B. The EMS technique offers the highest accuracy of 94.7% with complexity of 2.78 GBitOps. For networks with a similar complexity (2.78 GBitOps), the accuracy of the EMS approach is 0.3% higher than that of the DA. For networks with a similar accuracy (94.2%), the EMS approach produces a network which is 1.47X more efficient than that produced by the DA method.

Thus, the EMS technique can efficiently search for a suitable mixed-precision network and outperform other mixed-precision search algorithms in terms of both rate of convergence and throughput during network training. This property makes the EMS approach more feasible when training with a large-scale dataset. Moreover, the EMS approach outperforms other mixed-precision methods and the uniform quantization approach, in terms of network accuracy and complexity.

A goal of searching for an optimized mixed-precision neural network is to improve performance of a network while reducing memory and battery consumption. The EMS approach improves over existing mixed-precision technologies in those areas, which improves on-device AI development that would benefit mobile phone users. This becomes impractical with existing approaches that require a long time for network training, especially with a limited number of GPUs (e.g., on mobile devices). Taking ResNet-18 architecture as an example, it takes 140 GPU hours to achieve acceptable results using a NVIDIA RTX-2080 Ti card, which is one of the latest mixed-precision search approaches. As such, if a device only has a single GPU card, the same operation will take almost 6 days to complete on the ImageNet-scale dataset. In contrast, implementing the EMS technique under the same condition, the ResNet-18 experiment only cost about 3 days to achieve a similar accuracy using a significantly lower BitOps (e.g., 17% lower power consumption, 5% smaller model size and potentially a much faster inference), which reduces the experimental cycle by half.

Figure 6:
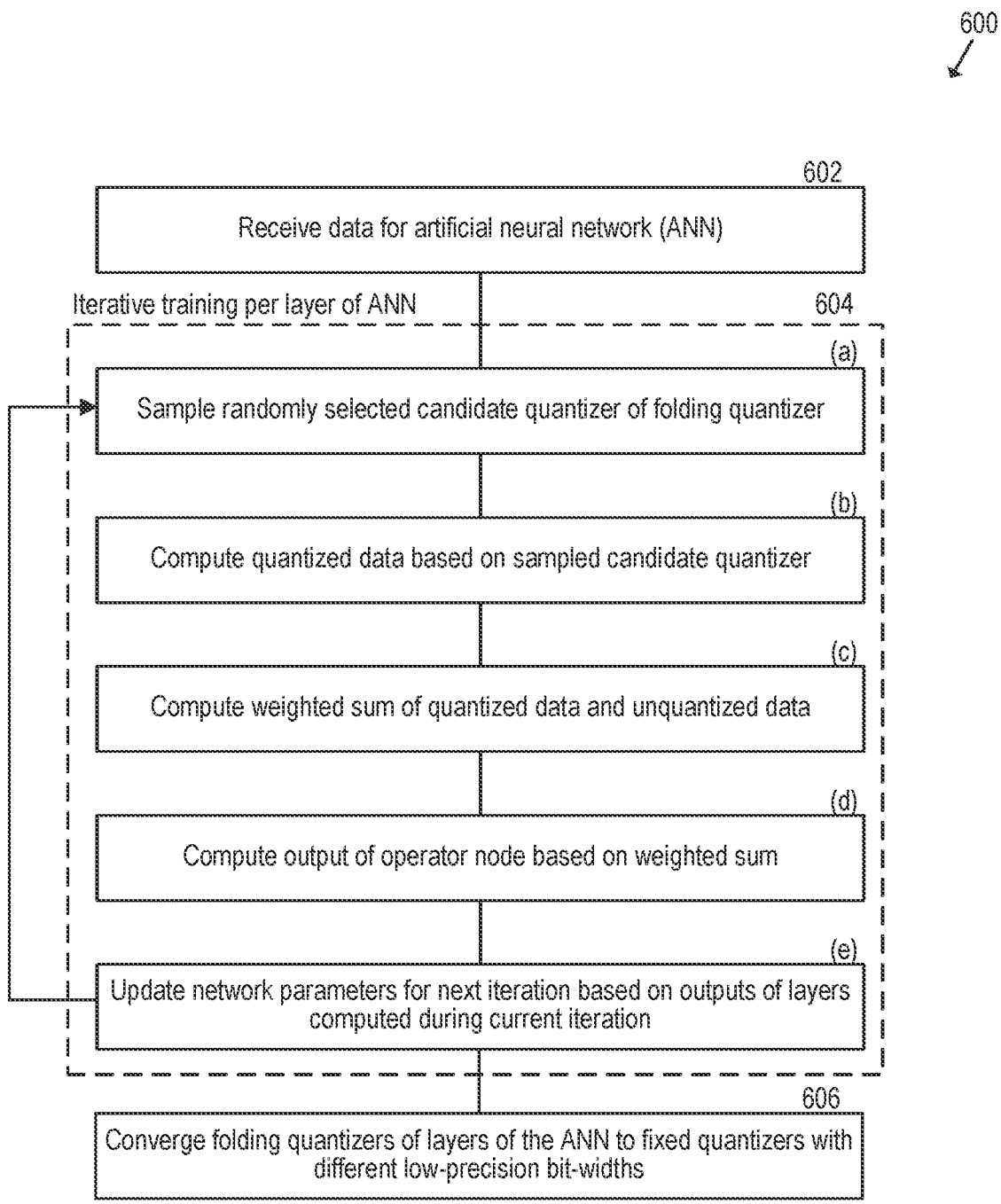
FIG. 6 is a flowchart that illustrates a method for performing an efficient mixed-precision search.

FIG. 6 is a flowchart that illustrates a method 600 for performing an EMS of an ANN. In one example, the method 600 is implemented with hardware and/or software in a compact network architecture of a mobile device. In another example, the method 600 is implemented at a server computer that is remotely located from a mobile device that receives input from a user. As such, the ANN can reside at the mobile device and/or remote server to process data input to a mobile device. The method 600 is performed by the layers of the network to design the ANN with optimal quantizers.

At 602, a data node of a layer of the ANN receives data (e.g., activation input, a weight). A layer of the ANN has a network architecture including a quantization edge and a parallel full-precision edge, which are each between the data node and an operator node (see, e.g., FIG. 2C). The quantization edge has a folding quantizer including a set of candidate quantizers that are alternatively selectable (e.g., a quantizer bank).

At 604, the ANN is trained iteratively to search for optimal quantizers in a mixed-precision ANN. At 604(a) a candidate quantizer of the folding quantizer is selected for sampling. The sampled quantizers are selected using one or more techniques including probabilistically, randomly, pseudo-randomly, deterministically, algorithmically, etc. In one example, a candidate quantizer is selected for sampling based on a probability distribution for the candidate quantizers. Generally, a candidate quantizer is selected for sampling to reduce (e.g., minimize) a classification loss, which is bounded by a complexity constraint for the ANN.

At 604(b), the received data is quantized based on the sampled quantizer. The quantized data has a low-precision format (a low bit-width) compared to the full-precision format of the original received data. In an implementation, a number of candidate quantizers available for sampling in each next iteration is reduced, which allows convergence to an optimal quantizer (which is then fixed for the layer).

At 604(c), a weighted sum is computed of the quantized data and the original (unquantized) data. That is, the quantized data and the original data are each weighted and summed. In one example, all the candidate quantizers use common weights (have the same weight values). In another example, the candidate quantizers use independent weights, that are different from each other and/or independently adjustable.

At 604(d), an output of the operator node is computed based on the weighted sum. In one example, the weighted sums of each layer are processed with respective operators. In an example where the data corresponds to activation inputs, each layer can include weights that are similarly processed to obtain quantized weights that are used to generate weighted sums of the weights. The weighted sums of the weights and activation inputs are processed as linear combinations for the operators of the respective layers.

At 604(e), the network parameters of the layers are updated for the next iteration based on outputs computed in the current iteration. Examples of network parameters include the weights for candidate quantizers. For example, the iterative training includes computing a classification loss, computing a gradient loss of the network parameters, and updating the network parameters to reduce the classification loss. In one example, the network parameters of unsampled candidate quantizers are updated in every iteration. In another example, the network parameters of all the candidate quantizers are updated in each iteration regardless of which candidate quantizer is sampled.

At 606, the folding quantizer of the layer converges to an optimal quantizer representing a low-precision bit-width. The folding quantizers of different layers converge to different low-precision bit-widths (hence, a multi-precision network results). In one example, the received data includes an activation input for a layer, which uses another folding quantizer to similarly quantize a weight for the operator node. The respective folding quantizers converge to obtain optimal quantizers for the activation input and the weight.

Network Environment

Figure 7:
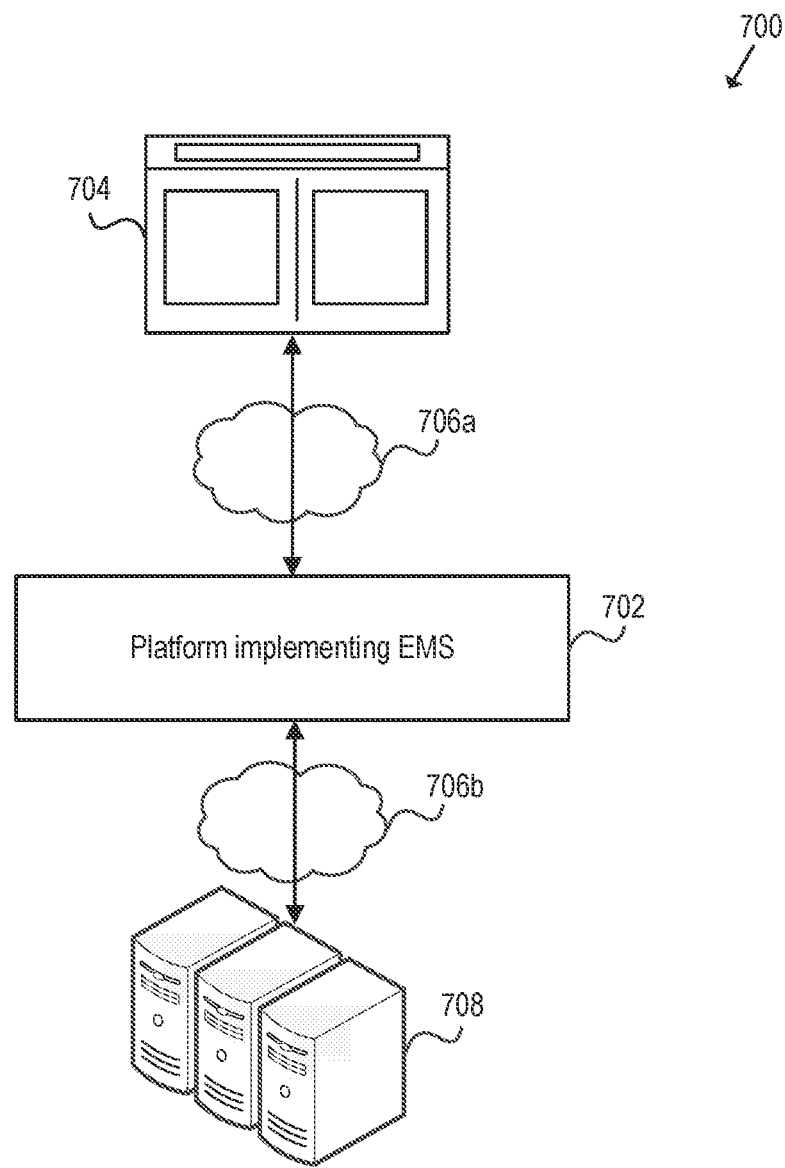
FIG. 7 illustrates a network environment that includes an engine to perform a NAS implementing the EMS technique.

FIG. 7 illustrates a network environment 700 including a platform 702 that implements the EMS technique. Individuals can interface with the platform 702 via an interface 704. The platform 702 can be embodied in any computing device (e.g., a mobile device). The platform 702 may be responsible for performing the processes of the disclosed EMS technique. A user can access the platform 702 and then submit, via an interface of the platform 702, a query for image classification.

In some embodiments, the platform 702 may reside in a network environment 700. Thus, the platform 702 may be connected to one or more networks 706a-b. The network(s) 706a-b can include personal area networks (PANs), local area networks (LANs), wide area networks (WANs), metropolitan area networks (MANs), cellular networks, the Internet, etc. Additionally or alternatively, the editing platform 1102 can be communicatively coupled to computing device(s) over a short-range communication protocol, such as Bluetooth® or near-field communication (NFC).

The interface 704 is accessible via a web browser, desktop application, mobile application, and/or over-the-top (OTT) application. Accordingly, the interface 704 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some features of the platform 702 can be hosted locally. That is, the search platform 702 may reside on the computing device used to access the interface 704. For example, the platform 702 may be embodied as a mobile application executing on a mobile computer. Other embodiments of the platform 702 are executed by a cloud computing service operated by Amazon Web Services® (AWS), Google Cloud Platform™, Microsoft Azure®, or a similar technology. In such embodiments, the platform 702 may reside on a host computer server that is communicatively coupled to one or more content computer servers 708. The content computer server(s) 708 can include different types of data (e.g., images, query logs), user information (e.g., profiles and credentials), and other assets. Such information could also be stored on the host computer server.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., graphics, matching algorithms, and processing operations) to be downloaded at a single point in time or on a periodic basis (e.g., weekly, daily, or hourly).

Computing System

Figure 8:
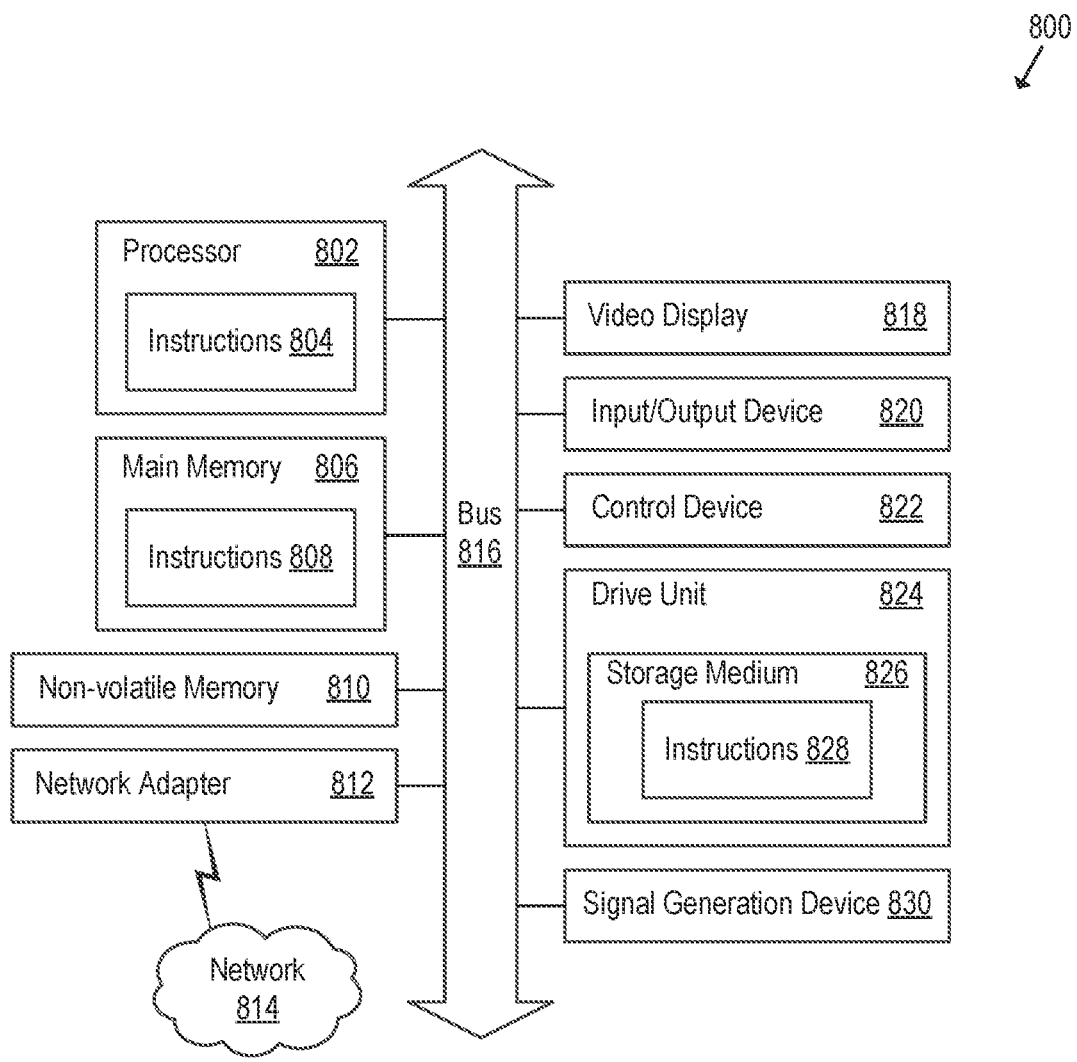
FIG. 8 is a block diagram illustrating an example of a computing system in which at least some operations described herein can be implemented.

FIG. 8 is a block diagram illustrating an example of a computing system 800 in which at least some operations described herein can be implemented. For example, some components of the computing system 800 may be hosted on a computing device that includes an editing platform (e.g., the platform 702 of FIG. 7).

The computing system 800 may include one or more central processing units (also referred to as "processors") 802, main memory 806, non-volatile memory 810, network adapter 812 (e.g., network interface), video display 818, input/output devices 820, control device 822 (e.g., keyboard and pointing devices), drive unit 824 including a non-transitory computer-readable storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1194 bus (also referred to as "Firewire").

The computing system 800 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the computing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the computing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and nonvolatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the computing system 800 to mediate data in a network 814 with an entity that is external to the computing system 800 through any communication protocol supported by the computing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A computer-implemented method for performing a mixed-precision search to design an optimal artificial neural network (ANN) that comprises different bit-widths for different layers of the ANN, the method comprising:
   receiving data at a data node of the ANN, wherein the ANN has a network architecture comprising the data node and an operator node with both a quantization edge and a parallel full-precision edge, the quantization edge contains a folding quantizer that includes a set of candidate quantizers with pre-defined bit-widths that are alternatively selectable, and the set of candidate quantizers are not concurrently executed; and
   training the ANN based on:
      independently sampling a candidate quantizer from the set of candidate quantizers of the folding quantizer that are alternatively selectable for a first training iteration of training the ANN, wherein the candidate quantizer represents weights and activations of the ANN;
      computing quantized data based on the candidate quantizer sampled from the set of candidate quantizers, the quantized data comprising a low-precision format with a low bit-width relative to a full-precision format of the received data at the data node;
      computing a weighted sum of the quantized data sampled by activating the candidate quantizer sampled from the set of candidate quantizers and unquantized data from the parallel full-precision edge, wherein the unquantized data comprises unsampled candidate quantizers that were replaced with skip connections;
      computing an output of the operator node based on the weighted sum; and
      updating network parameters of the ANN based on the output of the operator node computed from the weighted sum by updating unsampled candidate quantizers from the set of candidate quantizers to perform a subsequent training iteration of the ANN;
   converging the folding quantizer to a fixed optimal quantizer representing a low-precision bit-width relative to a full-precision bit-width of the data; and
   based on converging the folding quantizer to the fixed optimal quantizer, generating a trained ANN that comprises different bit-widths for different layers of the ANN.

2. The computer-implemented method of claim 1 further comprising:
converging an additional folding quantizer to an additional fixed optimal quantizer representing an additional low-precision bit-width that is different from the low-precision bit-width relative to the full-precision bit-width of the data, wherein the folding quantizer is for a first layer of the ANN and the additional folding quantizer is for a second layer of the ANN.

3. The computer-implemented method of claim 1, comprising:
for a first layer of the ANN, converging the folding quantizer to the fixed optimal quantizer representing the low-precision bit-width relative to the full-precision bit-width of the data;
receiving an activation input for a second layer of the ANN that includes an additional folding quantizer for a weight; and
for the second layer of the ANN, converging the additional folding quantizer to an additional fixed optimal quantizer representing an additional low-precision bit-width relative to a full-precision bit-width of the weight.

4. The computer-implemented method of claim 1, wherein training the ANN comprises:
reducing a number of the set of candidate quantizers available for sampling for the subsequent training iteration.

5. The computer-implemented method of claim 1, wherein training the ANN comprises:
computing a classification loss of the ANN;
computing a gradient loss of the network parameters; and
updating the network parameters to reduce the classification loss.

6. The computer-implemented method of claim 1, wherein training the ANN comprises:
selecting the candidate quantizer from the set of candidate quantizers for sampling is based on a learned probability distribution for the set of candidate quantizers, wherein the learned probability distribution is tied to network parameters of the ANN.

7. The computer-implemented method of claim 1, wherein training the ANN comprises:
selecting the candidate quantizer from the set of candidate quantizers for sampling to reduce a classification loss of the ANN bounded by a complexity constraint.

8. The computer-implemented method of claim 1, wherein training the ANN comprises:
for a first layer of the ANN and based on converging the folding quantizer to the fixed optimal quantizer, updating a network parameter of the unsampled candidate quantizers from the set of candidate quantizers; and
for a second layer of the ANN and based on converging an additional folding quantizer to an additional fixed optimal quantizer, updating a network parameter of additional unsampled candidate quantizers from an additional set of candidate quantizers.

9. The computer-implemented method of claim 1, wherein training the ANN comprises:
using a common weight for each candidate quantizer of the set of candidate quantizers.

10. The computer-implemented method of claim 1, wherein training the ANN comprises:
using an independent weight for each candidate quantizer of the set of candidate quantizers.

11. The computer-implemented method of claim 1, wherein training the ANN comprises:
updating the network parameters of the unsampled candidate quantizers from the set of candidate quantizers and the sampled candidate quantizer from the set of candidate quantizers for the subsequent training iteration.

12. A non-transitory computer readable medium storing instructions thereon that, when executed by at least one processor, cause a computing device to perform operations to design an optimal artificial neural network (ANN) that comprises different bit-widths for different layers of the ANN comprising:
receiving data at a data node of the ANN, wherein the ANN has a network architecture comprising the data node and an operator node with both a quantization edge and a parallel full-precision edge, the quantization edge contains a folding quantizer that includes a set of candidate quantizers with pre-defined bit-widths that are alternatively selectable, and the set of candidate quantizers are not concurrently executed; and
training the ANN based on:
independently sampling a candidate quantizer from the set of candidate quantizers of the folding quantizer that are alternatively selectable for a first training iteration of training the ANN, wherein the candidate quantizer represents weights and activations of the ANN;
computing quantized data based on the candidate quantizer sampled from the set of candidate quantizers, the quantized data comprising a low-precision format with a low bit-width relative to a full-precision format of the received data at the data node;
computing a weighted sum of the quantized data sampled by activating the candidate quantizer sampled from the set of candidate quantizers and unquantized data from the parallel full-precision edge, wherein the unquantized data comprises unsampled candidate quantizers that were replaced with skip connections;
computing an output of the operator node based on the weighted sum; and
updating network parameters of the ANN based on the output of the operator node computed from the weighted sum by updating unsampled candidate quantizers from the set of candidate quantizers to perform a subsequent training iteration of the ANN;
converging the folding quantizer to a fixed optimal quantizer representing a low-precision bit-width relative to a full-precision bit-width of the data; and
based on converging the folding quantizer to the fixed optimal quantizer, generating a trained ANN that comprises different bit-widths for different layers of the ANN.

13. The non-transitory computer readable medium of claim 12, further comprising:
converging an additional folding quantizer to an additional fixed optimal quantizer representing an additional low-precision bit-width that is different from the low-precision bit-width, wherein the folding quantizer is for a first layer of the ANN and the additional folding quantizer is for a second layer of the ANN.

14. The non-transitory computer readable medium of claim 12, comprising:
for a first layer of the ANN, converging the folding quantizer to the fixed optimal quantizer representing the low-precision bit-width relative to the full-precision bit-width of the data;

receiving an activation input for a second layer of the ANN that includes an additional folding quantizer for a weight; and for the second layer of the ANN, converging the additional folding quantizer to an additional fixed optimal quantizer representing an additional low-precision bit-width relative to a full-precision bit-width of the weight.

15. The non-transitory computer readable medium of claim 12 wherein training the ANN comprises:

selecting the candidate quantizer from the set of candidate quantizers for sampling is based on a learned probability distribution for the set of candidate quantizers, wherein the learned probability distribution is tied to network parameters of the ANN.

16. A system comprising:

at least one memory device comprising an artificial neural network (ANN) that comprises different bit-widths for different layers of the ANN, a data node, and an operator node; and at least one processor configured to cause the system to:
receive data at the data node of the ANN, wherein the ANN has a network architecture comprising the data node and the operator node with both a quantization edge and a parallel full-precision edge-, the quantization edge contains a folding quantizer that includes a set of candidate quantizers with pre-defined bit-widths that are alternatively selectable and the set of candidate quantizers are not concurrently executed; and train the ANN by:
independently sample a candidate quantizer from the set of candidate quantizers of the folding quantizer that are alternatively selectable for a first training iteration of training the ANN, wherein the candidate quantizer represents weights and activations of the ANN;

computing quantized data based on the candidate quantizer sampled from the set of candidate quantizers, the quantized data comprising a low-precision format with a low bit-width relative to a full-precision format of the received data at the data node;

computing a weighted sum of the quantized data sampled by activating the candidate quantizer sampled from the set of candidate quantizers and unquantized data from the parallel full-precision edge, wherein the unquantized data comprises unsampled candidate quantizers that were replaced with skip connections;

computing an output of the operator node based on the weighted sum; and updating network parameters of the ANN based on the output of the operator node computed from the weighted sum by updating unsampled candidate quantizers from the set of candidate quantizers to perform a subsequent training iteration of the ANN;

converge the folding quantizer to a fixed optimal quantizer representing a low-precision bit-width relative to a full-precision bit-width of the data; and based on converging the folding quantizer to the fixed optimal quantizer, generate a trained ANN that comprises different bit-widths for different layers of the ANN.

17. The system of claim 16, wherein the at least one processor is further configured to cause the system to converge an additional folding quantizer to an additional fixed optimal quantizer representing an additional low-precision bit-width that is different from the low-precision bit-width, wherein the folding quantizer is for a first layer of the ANN and the additional folding quantizer is for a second layer of the ANN.

18. The system of claim 16, wherein the at least one processor is further configured to cause the system to:

for a first layer of the ANN, converge the folding quantizer to the fixed optimal quantizer representing the low-precision bit-width relative to the full-precision bit-width of the data;

receive an activation input for a second layer of the ANN that includes an additional folding quantizer for a weight; and for the second layer of the ANN, converge the additional folding quantizer to an additional fixed optimal quantizer representing an additional low-precision bit-width relative to a full-precision bit-width of the weight.

19. The system of claim 16, wherein the at least one processor is further configured to cause the system to reduce a number of the set of candidate quantizers available for sampling for the subsequent training iteration.

20. The system of claim 16, wherein the at least one processor is further configured to cause the system to:

compute a classification loss of the ANN;

compute a gradient loss of the network parameters; and update the network parameters to reduce the classification loss.

* * * * *